(12) United States Patent
Hara et al.

(10) Patent No.: US 6,966,655 B2
(45) Date of Patent: Nov. 22, 2005

(54) PROJECTION TYPE DISPLAY DEVICE (75) Inventors: Nobuyuki Hara, Kanagawa (JP); Kazuhisa Hamada, Kanagawa (JP); Naoya Matsuda, Tokyo (JP); Akihito Yajima, Kanagawa (JP)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 10/673,729

(22) Filed: Sep. 29, 2003

(65) Prior Publication Data
US 2004/0125343 A1 Jul. 1, 2004

(30) Foreign Application Priority Data
Oct. 11, 2002 (JP) .......................... P2002-299426
Oct. 11, 2002 (JP) .......................... P2002-299534

(51) Int. Cl.[7] ...................... G03B 21/14; G03B 21/16; G03B 21/18
(52) U.S. Cl. ........................................................ 353/61
(58) Field of Search .............................. 353/52, 57, 58, 353/60, 61, 119; 362/373

(56) References Cited
U.S. PATENT DOCUMENTS

| 2,570,507 A | * | 10/1951 | Andreoli ...................... 353/61 |
| 5,993,008 A | * | 11/1999 | Hashimukai et al. ......... 353/61 |
| 6,533,421 B2 | * | 3/2003 | Ono ............................ 353/61 |
| 6,736,513 B2 | * | 5/2004 | Koyama et al. ............... 353/58 |
| 6,857,749 B2 | * | 2/2005 | Fuse et al. ...................... 353/57 |
| 2002/0008852 A1 | * | 1/2002 | Onishi et al. .................. 353/57 |
| 2002/0027643 A1 | * | 3/2002 | Takizawa et al. ............. 353/57 |
| 2003/0202160 A1 | * | 10/2003 | Chimura et al. ............... 353/52 |
| 2003/0214636 A1 | * | 11/2003 | Shiraishi et al. ............... 353/57 |
| 2004/0189953 A1 | * | 9/2004 | Wu et al. ....................... 353/58 |

* cited by examiner

Primary Examiner—Christopher Mahoney
(74) Attorney, Agent, or Firm—Jay H. Maioli

(57) ABSTRACT

A projection type display device, in which efficient cooling is performed in a remarkably silent manner, includes: a light source unit; an optical unit for modulating illumination light output from the light source unit based on input image information; two power source sections and; a box for housing the optical unit, the light source unit and the power source sections; and a cover member for entirely covering at least an upper surface of the box, wherein an outlet for externally exhausting air in the box by using axial fans is provided only on a bottom side of the box. Liquid crystal panels that are held by the optical unit frame absorb the illumination light from the light source unit and thus have different increased temperatures. Cooling air blown through an outlet of a sirocco fan that is directly connected to the optical unit frame is divided by a cooling air reservoir and a distribution sheet into predetermined air quantities in accordance with the temperatures of the liquid crystal panels so that the quantities of air obtained by the division are directly sent to the liquid crystal panels.

9 Claims, 8 Drawing Sheets

PROJECTION TYPE DISPLAY DEVICE

BACKGROUND OF THE INVENTION

CROSS REFERENCE TO RELATED APPLICATIONS

The present document is based on Japanese Priority Applications JP2002-299426 and JP2002-299534, both filed in the Japanese Patent Office on Oct. 11, 2002, the contents of which being incorporated herein by reference to the extent permitted by law.

BACKGROUND OF THE INVENTION

1. Field of the Invention

The present invention relates to a projection type display device such as a liquid crystal projector.

2. Description of the Related Art

A liquid crystal projector conventionally includes a light source supported by a reflector; and a light bulb composed of a liquid crystal panel for modulating illumination light emitted from the light source based on an input video signal, etc. The modulated illumination light is projected onto a screen or the like through a projection lens.

In such a liquid crystal projector, various optical components whose temperatures are elevated when the liquid crystal projector is driven, for example, a light bulb, a polarizing plate and the like are required to be cooled by cooling air so as to keep their temperatures so as not to exceed a maximum guaranteed temperature. Moreover, it is necessary to exhaust heat generated from a light source or a power source to the exterior of the device so as to prevent a temperature of the device from increasing.

On the other hand, in the liquid crystal projector, for example, if a sirocco fan or an axial fan is used, the fan makes noise. The noise is required to be restrained as much as possible.

Various techniques for realizing both the effective cooling of a device and the restriction of noise generation have been conventionally proposed (see Japanese Patent Application Laid Open JP 2001-51349 A).

An outlet (exhaust louver) for exhausting air from a box of a liquid crystal projector is often provided on a lateral face of the box. With the exhaust louver provided on the lateral face of the box, noise generated in the box is likely to be diffused through the exhaust louver. Moreover, there is a possibility that the exhaust louver may act as a resistance against airflow to elevate a noise level.

Figure 13:
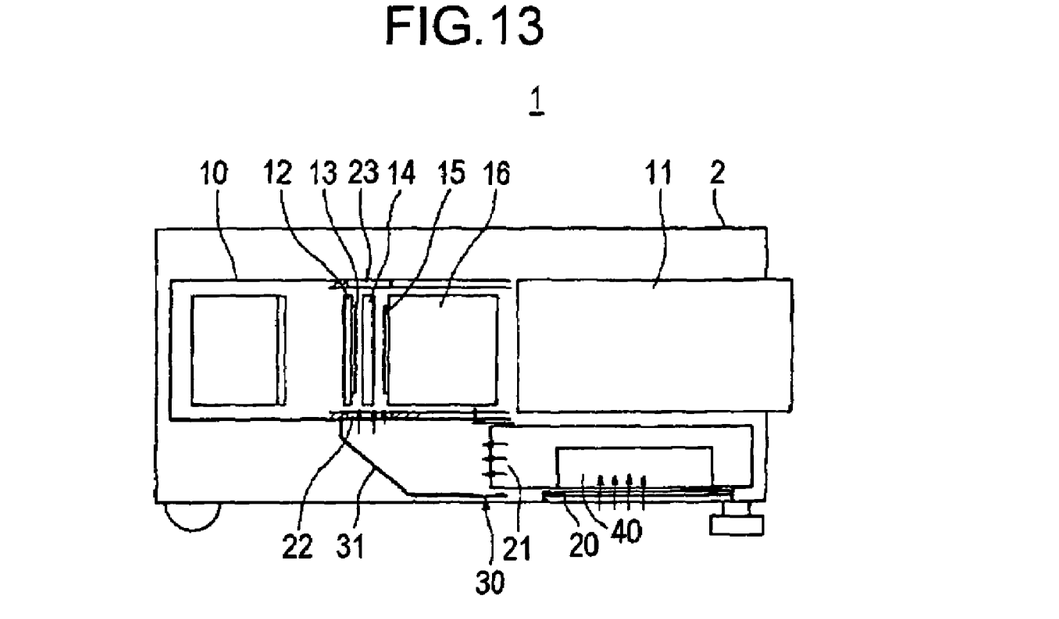
FIG. 13 is a sectional view showing a cooling structure of a liquid crystal panel in a conventional liquid crystal projector.

Moreover, FIG. 13 shows an example of a liquid crystal projector. A liquid crystal projector 1 shown in FIG. 13 includes: an optical unit frame 10 placed in a box 2; and a projection lens 11 placed so as to be continuous with the optical unit frame 10. Optical paths, through which, for example, red light, blue light and green light respectively pass, are provided in the optical unit frame 10. Taking green light as an example, green light propagating through the optical path passes through a condenser lens 12, an incident-side polarizing plate 13, a liquid crystal panel 14 and an output-side polarizing plate 15, which are provided in the optical path, to reach a cross prism 16.

The green light, which is condensed by the condenser lens 12 to be incident on the liquid crystal panel 14 through the polarizing plate 13, is modulated on the liquid crystal panel 14 based on image data. Then, the modulated green light passes through the polarizing plate 15 to control its transmittance.

The green light having the controlled transmittance is coupled with red light and blue light, each obtaining a controlled transmittance in a similar manner, at the cross prism 16.

The resulting light coupled at the cross prism 16 is projected onto a screen (not shown) through the projection lens 11 to display an image thereon.

In such a liquid crystal projector, optical components that generate heat due to energy of the emitted light, such as the polarizing plates 13 and 15 and the liquid crystal panel 14, are cooled with air blown by a sirocco fan 40.

For example, the sirocco fan 40 placed in a lower part of the box 2 takes air in from an air inlet port 20 to blow the intake air through an air blowing port 21, thereby cooling the optical components.

Conventionally, as shown in FIG. 13, air blown from the air blowing port 21 is guided toward the optical components such as the liquid crystal panel through a duct 30 connected to the air blowing port 21 while changing a direction of the airflow with an inclined plane 31 of the duct 30 (for example, see Japanese Patent Application Laid Open JP 2002-189250 A (FIG. 4), Japanese Patent Application Laid Open JP 2002-189251 A (FIG. 2) and Japanese Patent Application Laid Open JP 2001-13589 A (FIG. 2)).

The airflow whose direction has been changed by the inclined plane 31 is sent to the heat-generating optical components through an inlet-side opening 22 provided for an optical unit frame 10 so as to be exhausted from an exhaust-side opening 23, thereby cooling the optical components.

Another liquid crystal projector, in which the sirocco fan 40 is placed along its lateral face instead of being placed in a lower part of the box 2, is also known (for example, Japanese Patent Application Laid Open JP 2002-188597 A (FIG. 2)).

Also in this case, air blown from the sirocco fan 40 is similarly guided to the optical components that generate heat, via a duct connected to the air blowing port of the sirocco fan 40.

SUMMARY OF THE INVENTION

However, if air is sent to the optical components through the duct as described above, a pressure loss is likely to increase due to the duct. Moreover, the quantity of air to be blown is sometimes remarkably reduced due to turbulence generated in the duct. Therefore, there is a possibility that cooling may become insufficient, so that the heat-generating optical components cannot achieve their predetermined performance.

If the number of revolutions of the sirocco fan 40 itself is increased in order to ensure a sufficient quantity of air to be blown, noise is likely to increase. The increase in noise is inconvenient for a liquid crystal projector which may be used in a relatively small space such as a meeting room. Therefore, a driving voltage of the sirocco fan 40 cannot be increased above required.

In view of the above-described problems, the present invention has been conceived in order to providing a projection type display device, in which cooling is efficiently performed so that the display device is operated in a remarkably silent manner.

A projection type display device according to a preferred embodiment of the present invention, includes: a light source; an optical system for modulating illumination light output from the light source based on input image information; a power source section for supplying electric power for driving at least the light source; a box for housing the optical system, the light source and the power source section; exhaust means for externally exhausting air in the box by using an axial fan; and a cover member for entirely covering at least an upper surface of the box, wherein an outlet of the exhaust means is provided only on a bottom side of the box.

It is preferable that the exhaust means includes: exhaust means for light source, for generating an airflow for exhausting heat generated from the light source; and exhaust means for power source, for generating an airflow for externally exhausting heat generated from the power source section, wherein paths for the airflows generated by the exhaust means for light source and the exhaust means for power source are separated from each other.

Still preferably, the present invention further includes a support for supporting the box, wherein the box is supported by the support and has a projecting portion that projects downwardly; and an outlet of the exhaust means for light source is formed in the projecting portion so as to laterally exhaust air between the support and the box.

In the present invention, at least the upper surface of the box is entirely covered with the cover member. At the same time, the outlet of the exhaust means using the axial fan is provided only in the lower part of the box. The cover member acts as a soundproof barrier for blocking noise generated by the axial fan in the box. Moreover, since the outlet, from which the noise leaks, is provided only on the bottom side of the box, the noise generated in the box is hardly transmitted directly to the user.

A display device according to a preferred embodiment of the present invention is a projection type display device for modulating illumination light based on input image data and projecting the modulated illumination light. The display device includes: a sirocco fan, directly connected to a frame for holding a plurality of optical components which to have temperature increased as absorbing the illumination light, for exhausting cooling air obtained by taking air in toward the optical components from an outlet; and distribution means for distributing the cooling air from the outlet into air quantities which are in accordance with different increased temperatures of the plurality of optical components.

In the projection type display device according to a preferred embodiment of the present invention, the illumination light is modulated based on input image data and is then projected to display image.

A plurality of optical components is held by a frame of the projection type display device. The optical components absorb the radiated illumination light to have different increased temperatures.

A sirocco fan is directly connected to the frame for taking air in and exhausting the air from an outlet as cooling air.

The sirocco fan sends the cooling air from the outlet directly to the optical components to cool the optical components having increased temperatures. At this event, the distribution means provided for the outlet divides the cooling air into air quantities in accordance with different temperatures of the plurality of optical components so that the quantities of air obtained by the division are sent to the respective optical components.

According to the preferred embodiments of the present invention, a projection type display device can be obtained, capable of performing efficient cooling and operating in a remarkably silent manner.

BRIEF DESCRIPTION OF THE DRAWINGS

The above and other features and advantages of the present invention will become more apparent from the following description of the presently exemplary preferred embodiment of the present invention taken in conjunction with the accompanying drawings, in which.

DESCRIPTION OF THE PREFERRED EMBODIMENTS

Hereinafter, embodiments of the present invention will be described with reference to the accompanying drawings.

Figure 1:
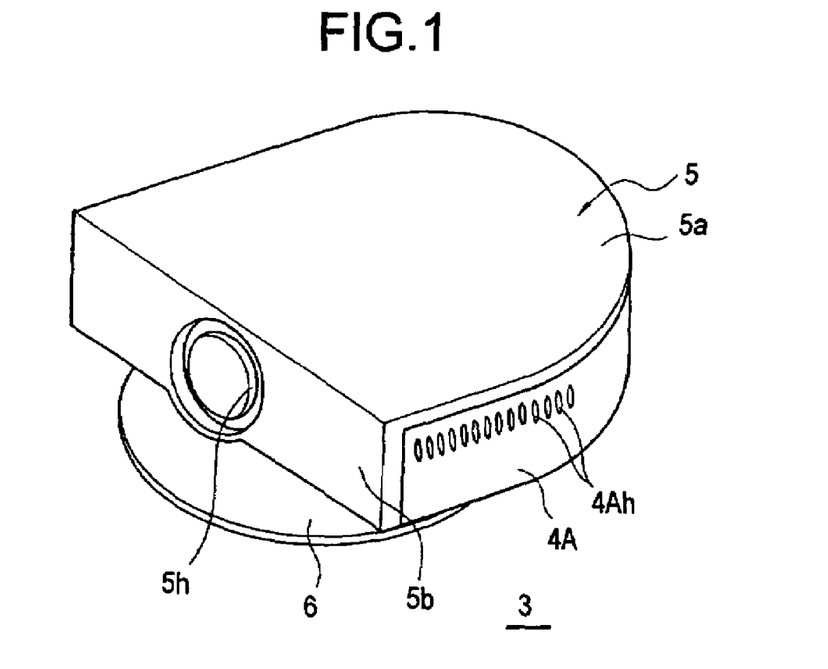
FIG. 1 is a perspective view of a liquid crystal projector according to a preferred embodiment of a projection type display device of the present invention.
Figure 2:
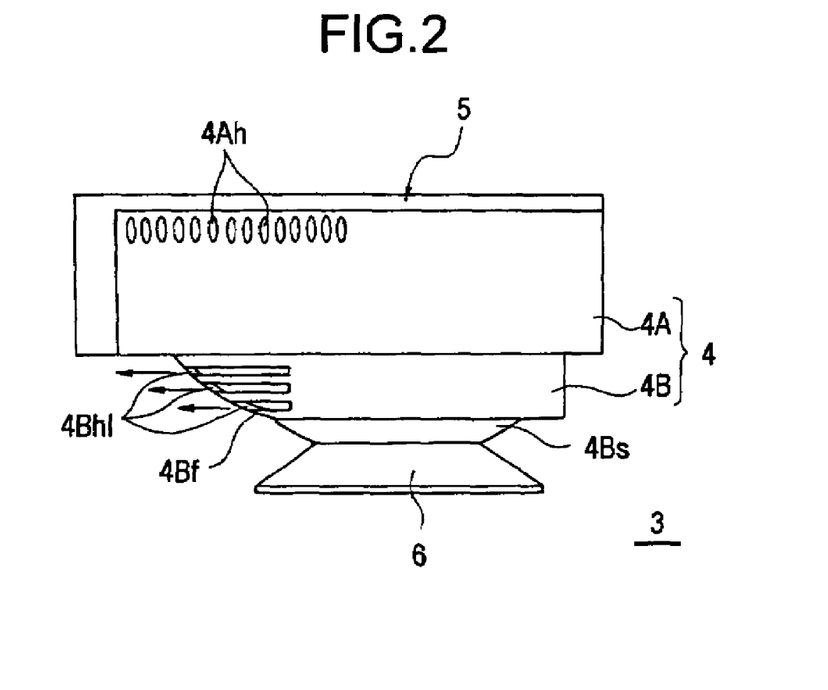
FIG. 2 is a side view of the liquid crystal projector shown in FIG. 1.

FIG. 1 is a perspective view of a liquid crystal projector according to one embodiment of a projection type display device of the present invention. FIG. 2 is a side view of the liquid crystal projector shown in FIG. 1.

As shown in FIGS. 1 and 2, a liquid crystal projector 3 includes: a box 4; a cover member 5; and a support 6. The box 4 is constituted by an upper box 4A and a lower box 4B.

As can be seen from FIG. 2, the lower box 4B includes a projecting portion that projects downwardly from a lower end of the upper box 4A. The support 6 supports the projecting portion.

Various components are housed within a closed space formed between the upper box 4A and the lower box 4B.

Inlet ports 4Ah are formed on one lateral face of the upper box 4A.

The cover member 5 is provided for the upper box 4A. The cover member 5 includes: an upper portion 5a entirely covering an upper face of the upper box 4A; and a front portion 5b for covering a front surface of the upper box 4A.

A projection port 5h for projecting an image is formed on the front portion 5b of the cover member 5.

Figures 3, 4:
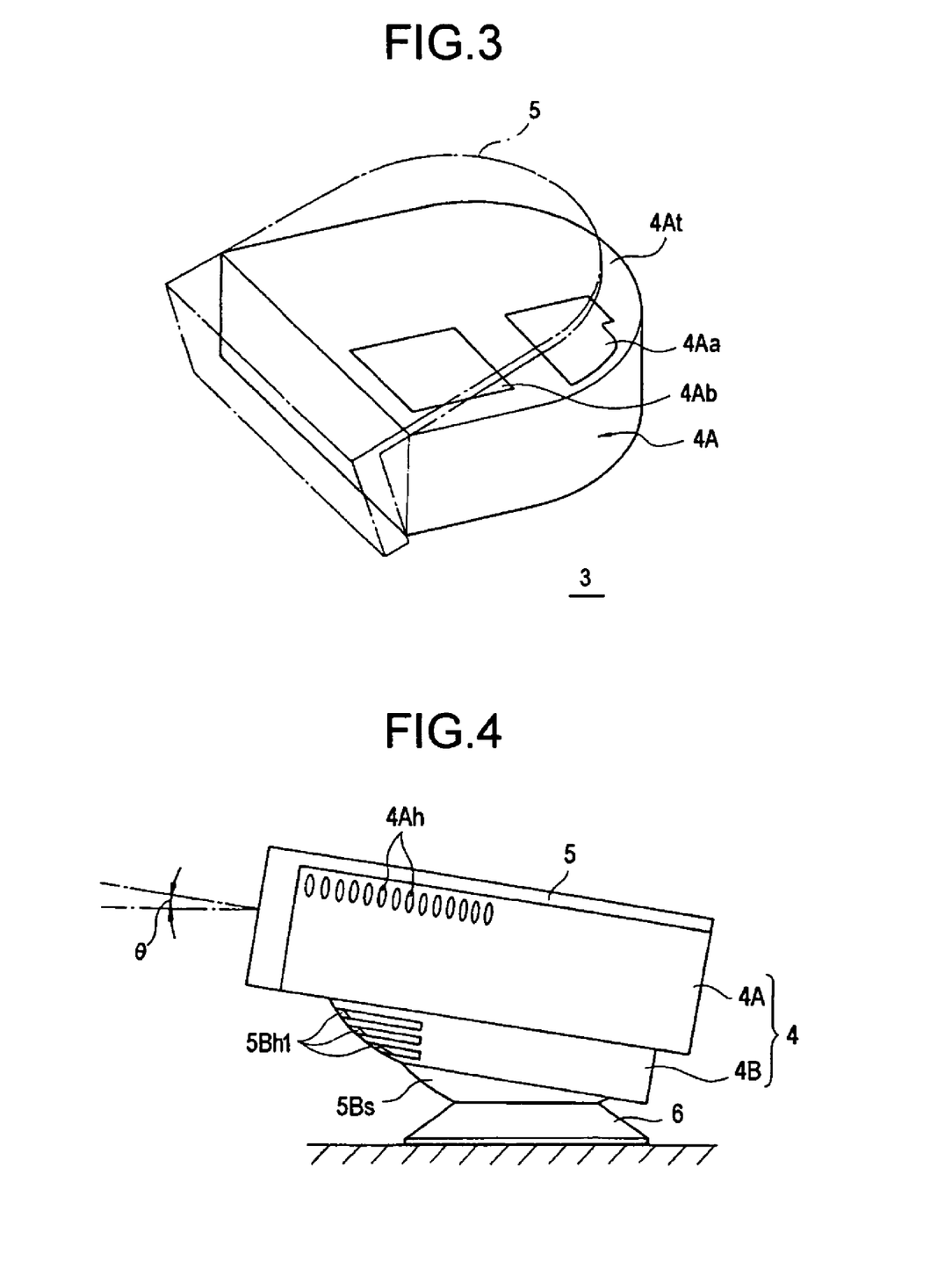
FIG. 3 is a perspective view showing a state where a cover member is removed from an upper box.
FIG. 4 is a view showing a state where an angle of elevation of the liquid crystal projector is adjusted.

FIG. 3 is a perspective view showing a state where the cover member 5 is removed from the upper box 4A.

As shown in FIG. 3, the cover member 5 is removable from the upper box 4A. On an upper face 4At of the upper box 4A, an opening 4Aa for attaching/removing a light source described below and an opening 4Ab for attaching/removing an air filter described below are formed.

The cover member 5 covers the openings 4Aa and 4Ab. Therefore, the openings 4Aa and 4Ab are normally invisible from the exterior.

In FIG. 2, outlets 4Bh1 are formed on a front lateral face 4Bf of the projecting portion of the lower box 4B. From the outlets 4Bh1, air exhausted from the box 4 is discharged in a lateral direction, that is, in a horizontal direction along interstice regions between the support 6 and the upper box 4A. The lowermost bottom of the lower box 4B includes a spherical portion 5Bs supported by the support 6.

As shown in FIG. 4, the spherical portion 5Bs is moved on the support 6 so that the position of the box 4 is adjustable. An angle of elevation θ is adjusted by changing the position of the box 4. The angle of elevation θ is an angle with respect to a horizontal plane in a direction of projection.

Figure 5:
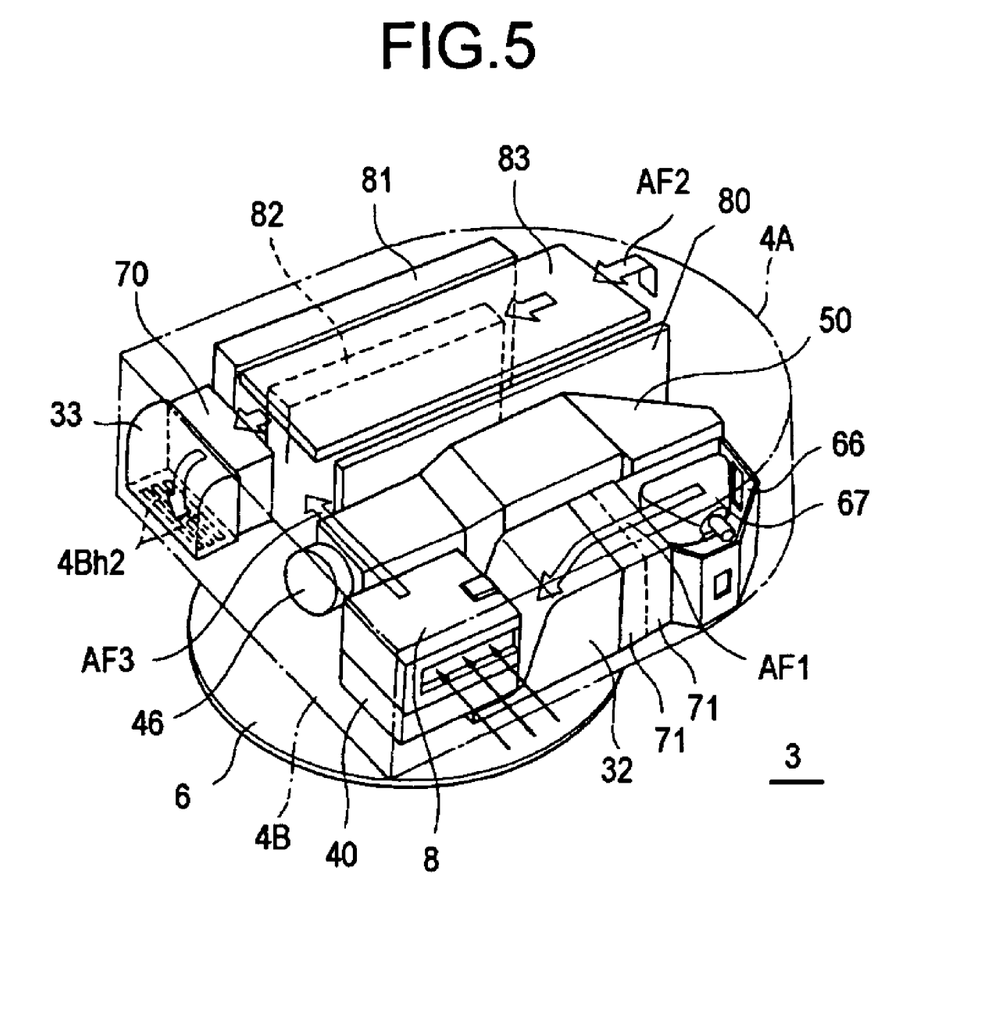
FIG. 5 is a perspective view showing an internal structure of the liquid crystal projector.

FIG. 5 is a perspective view showing an internal structure of the liquid crystal projector 3. In FIG. 5, the cover member 5 is omitted, and the upper box 4A and the lower box 4B are indicated with phantom lines.

As shown in FIG. 5, the liquid crystal projector 3 includes: an optical unit case 50; a light source unit 66; an axial fan 70 for exhausting heat generated from a power source; an air guide 33; axial fans 71 for heat generated from a light source; an exhaust duct 32; a substrate 80 for image display; a power source section 81; a power source section 82 for light source; an air filter 8; and a sirocco fan 40.

The optical unit case 50 is formed by, for example, die casting of aluminum. An optical unit 66 constituted by various optical components are housed within the optical unit case 50.

Figure 6:
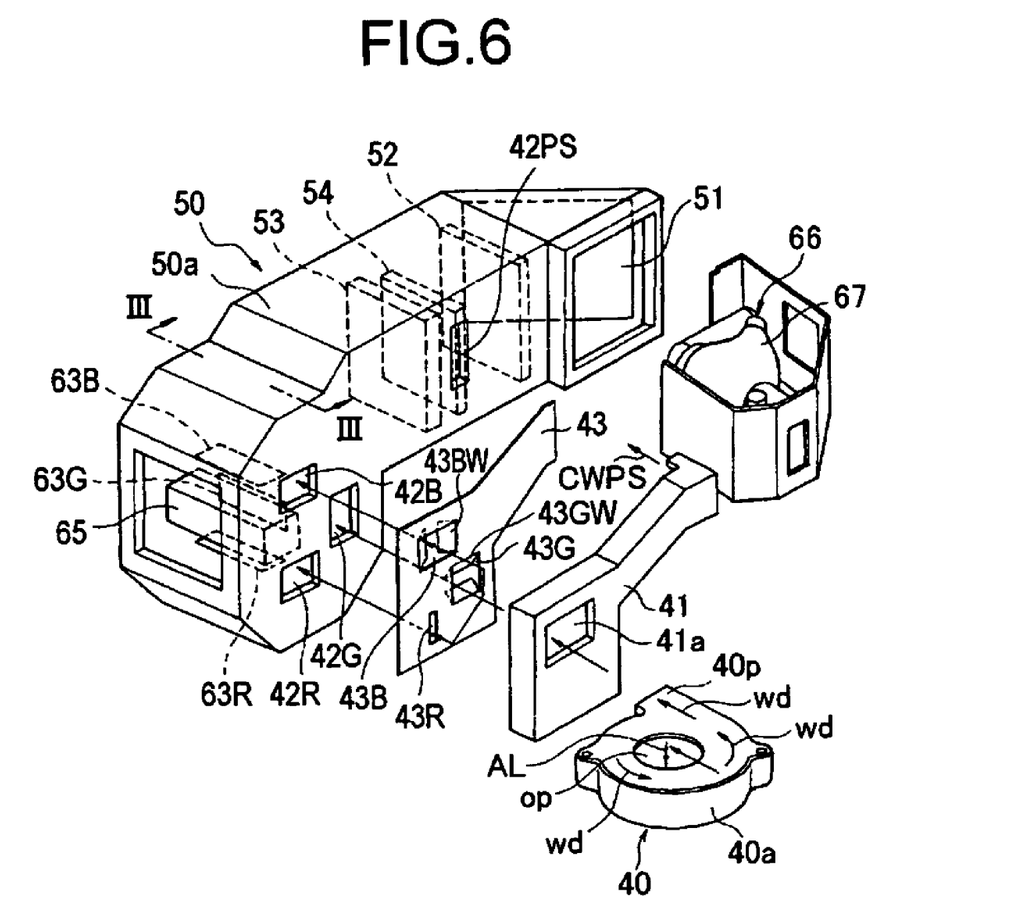
FIG. 6 is a perspective view showing the connection between an optical unit, a light source and a sirocco fan shown in FIG. 5.

As shown in FIG. 6, the optical unit 66 is provided on the incident side of a total reflection mirror 51. As shown in FIG. 5, the optical unit 66 is assembled as an integral unit in which a light source (not shown) is attached to a reflector 67. The optical unit 66 is attachable/removable through the opening 4Aa of the upper box 4A shown in FIG. 3.

As a light source of the light source unit 66, for example, a halogen lamp, a metal halide lamp, a xenon lamp or the like is used. The light source unit 66 emits heat to have a high temperature. Therefore, it is necessary to externally exhaust heat generated from the light source unit 66.

In FIG. 5, the air filter 8 is placed in an upper part of the sirocco fan 40. The air filter 8 is provided so as to prevent dust from entering the box 4 from the exterior by air intake of the sirocco fan 40. The air intake through the air filter 8 is performed through the inlet ports 4Ah formed on the lateral face of the upper box 4A. The air filter 8 is attachable/removable through the opening 4Ab of the upper box 4A shown in FIG. 3.

Next, optical paths for illumination lights emitted from the light source 66 will be described with reference to FIGS. 6 and 7.

Figure 7:
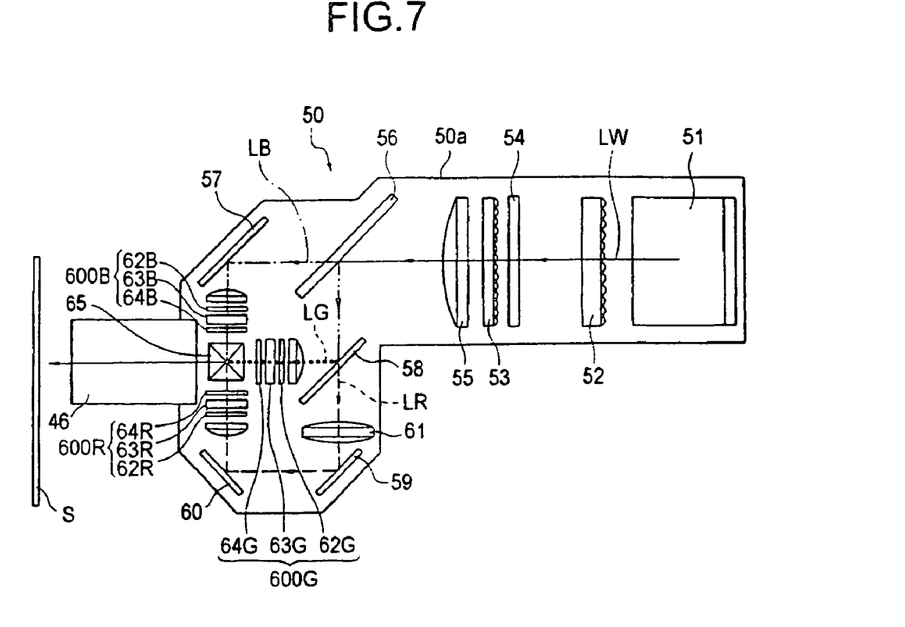
FIG. 7 is a side view showing the optical unit shown in FIG. 6.

FIG. 6 is a perspective view for illustrating a structure of the optical unit 50 and the connection between the optical unit 50 and the light source 66, and the sirocco fan 40 and FIG. 7 is a schematic view showing a configuration of the optical unit 50 seen from its lateral view. However, for simplification purposes, part of components are omitted from the perspective view of FIG. 6 illustrating the optical unit 50.

As illustrated in FIGS. 6 and 7, the optical unit 50 includes: total reflection mirrors 51, 57, 59 and 60; fly-eye lenses 52 and 53; a PS converting element 54; a condenser lens 55; dichroic mirrors 56 and 58; a relay lens 61; incident-side polarizing plates 62R, 62G and 62B; liquid crystal panels 63R, 63G and 63B; output-side polarizing plates 64R, 64G and 64B; a cross prism 65; and a projection lens 46.

The optical components are appropriately held by an optical unit frame 50a.

The optical unit frame 50a corresponds to one embodiment of a frame in the present invention.

White light LW including red light (hereinafter, referred to as R-light), green light (hereinafter, referred to as G-light), and blue light (hereinafter, referred to as B-light) is emitted from the light source 66.

The white light LW emitted from the light source 66 is reflected by the total reflection mirror 51 so as to be guided into the optical unit 50.

In the optical unit 50, the fly-eye lens 52, the PS converging element 54, the fly-eye lens 53 and the condenser lens 55 are provided in this order from the side where the total reflection mirror 51 is placed.

The fly-eye lenses 52 and 53 divides the white light LW having an intensity distribution, which is emitted from the light source 66, into a plurality of light beams so that the intensity distributions of light radiated onto the liquid crystal panels 63R, 63G and 63B become uniform.

The PS converting element 54 includes: polarizing beam splitters arranged in a striped manner; and phase plates provided intermittently so as to correspond to the polarizing beam splitters. With this structure, light is emitted after the directions of polarization of the incident light are aligned with each other.

As the phase plate, for example, a half-wave plate is used. The PS converting element 54 separates the incident light into two polarized light components, that is, a P-polarized light component and an S-polarized light component. One of the separated polarized light components (for example, the P-polarized light) transmits through the PS converting element 54 while keeping its direction of polarization, whereas the other polarized light (for example, the S-polarized light) is converted into the other direction of polarization (for example, the P-polarized light) by the functions of the half-wave plate. As a result, the incident light is emitted with the directions of polarization being aligned with each other.

The condenser lens 55 condenses the white light LW having the aligned direction of polarization and the uniform intensity distribution.

The dichroic mirror 56 is provided on the output side of the condenser lens 55 from which the white light LW is emitted.

The dichroic mirror 56 only transmits the blue light LB in the incident white light LW and reflects the light of the other colors so as to separate the blue light LB.

In an optical path for the blue light LB separated by the dichroic mirror 56, the total reflection mirror 57, the incident-side polarizing plate 62B, the liquid crystal panel 63B and the output-side polarizing plate 64B are provided in this order.

The total reflection mirror 57 reflects the blue light LB, which is separated by the dichroic mirror 56, toward the incident-side polarizing plate 62B.

The incident-side polarizing plate 62B transmits the blue light LB having a predetermined direction of polarization.

Image data is transmitted to the liquid crystal panel 63B through the substrate 80 for image display. The liquid crystal panel 63B changes a direction of alignment of liquid crystal molecules in accordance with the image data to rotate a plane of polarization of the incident blue light LB, thereby modulating the blue light LB.

The output-side polarizing plate 64B transmits a predetermined polarized light component of the blue light LB which has the rotated plane of polarization and is then emitted from the liquid crystal panel 63B. As a result, a transmittance of the blue light LB transmitted through the output-side polarizing plate 64B is changed in accordance with the image data.

The predetermined polarized light component of the blue light LB, which is transmitted through the output-side polarizing plate 64B, is incident on the cross prism 65.

Hereinafter, the incident-side polarizing plate 62B, the liquid crystal panel 63B and the output-side polarizing plate 64B are sometimes collectively referred to as an element 600B for display.

The dichroic mirror 58 is provided in a direction in which the light having the colors other than the blue light LB is reflected by the dichroic mirror 56.

The dichroic mirror 58 reflects only the green light LB of the incident light while transmitting only the red light LR.

As in the case of the blue light LB, in an optical path for the green light LB reflected and separated by the dichroic mirror 58, the incident-side polarizing plate 62G, the liquid crystal panel 63G and the output-side polarizing plate 64G are provided.

Since the functions of the incident-side polarizing plate 62G, the liquid crystal panel 63G and the output-side polarizing plate 64G are the same as those in the optical path for the blue light LB, the detailed description thereof is herein omitted. Hereinafter, the incident-side polarizing plate 62G, the liquid crystal panel 63G and the output-side polarizing plate 64G are sometimes collectively referred to as an element 600G for display.

In an optical path of the red light LR which transmits the dichroic mirror 58 to be separated, the relay lens 61 and total reflection mirrors 59 and 60 are provided.

The relay lens 61 serves to converge light which is diffused while propagating through the optical path.

The red light LR, which is transmitted through the relay lens 61, is reflected by the total reflection mirrors 59 and 60 at a predetermined angle to incide on the incident-side polarizing plate 62R. As in the cases of the blue light LB and the green light LG, a predetermined polarized component of the red light LR, which is transmitted through the incident-side polarizing plate 62R, is then modulated by the liquid crystal panel 63R so as to change its transmittance through the output-side polarizing plate 64R.

Hereinafter, the incident-side polarizing plate 62R, the liquid crystal panel 63R and the output-side polarizing plate 64R are sometimes collectively referred to as an element 600R for display.

Field lenses are also provided between the total reflection mirror 57 and the incident-side polarizing plate 62B, between the dichroic mirror 58 and the incident-side polarizing plate 62G, and between the total reflection mirror 60 and the incident-side polarizing plate 62R, respectively.

The cross prism 65 having the function of synthesizing the blue light LB, the green light LG and the red light LR is provided at the crossing point of the optical paths for the light of three colors that are respectively output from the output-side polarizing plates 64B, 64G and 64R.

The cross prism 65 reflects the incident blue light LB and red light LR toward the projection lens 46 while transmitting the green light LG toward the projection lens 46 without any reflection, thereby synthesizing the light of the three colors.

The light, which is subjected to color synthesis through the cross prism 65, is projected onto a target of projection such as a screen S via the projection lens 46 so as to display an image on the screen S.

Various optical components in the optical unit 50 absorb the illumination light emitted from the light source 66 thus having their temperature increased. Particularly, the PS converting element 54, the polarizing plates 62R, 62G, 62B, 64R, 64G and 64B and the liquid crystal panels 63R, 63G and 63B are more likely to have increased temperatures because these optical components are used for conversion or modulation of a direction of polarization and transmission/non-transmission of light.

In the liquid crystal 3 according to the preferred embodiment of the present invention, the optical components that absorb the illumination light to have increased temperatures are cooled so as to ensure desired performance of the liquid crystal projector 3.

As shown in FIG. 6, the sirocco fan 40 is a flat type centrifugal multibladed fan. A rotary wheel having a plurality of blades (not shown) is housed within a case 40a so as to be rotatable about a predetermined rotation axis.

As described above, by the rotation of the rotary wheel of the sirocco fan 40, air, which is taken in from the openings (inlet ports) 4Ah on a lateral face of an upper box cover 4A, is taken into the sirocco fan 40 through an opening op on an upper surface of the case 40a along a direction of a rotational axis AL. The air taken into the sirocco fan 40 flows along a direction of rotation wd of the rotary wheel so as to be exhausted from an outlet 40p of the case 40 as cooling air.

Figure 8:
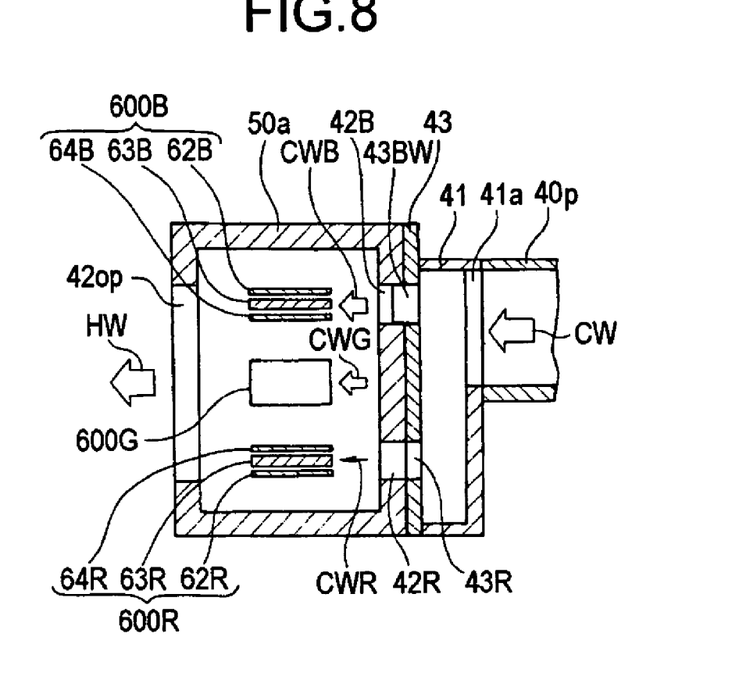
FIG. 8 is a sectional view taken along a line III—III in FIG. 6.

The sirocco fan 40 is directly connected to the optical unit frame 50a through a cooling air reservoir 41 and a distribution sheet 43. FIG. 8 is a sectional view taken along a line III—III in FIG. 6 in a state where the sirocco fan 40 is connected to the optical unit frame 50a.

In the preferred embodiment of the present invention, a "directly connected state" means that the sirocco fan 40 is connected to the optical unit frame 50a without through any components such as a duct for changing a direction of a cooling airflow.

As shown in FIGS. 6 and 8, an opening 41a is provided for the cooling air reservoir 41 on the sirocco fan 40 side, whereas three openings 43R, 43G and 43B are provided for the distribution sheet 43.

Three openings 42R, 42G and 42B are also provided on a side wall of the optical unit frame 50a on the sirocco fan 40 side.

The openings 42R and 43R, 42R and 43G, and 42B and 43B are provided at the positions corresponding to the positions where the elements for display, 600R, 600G and 600B are provided.

The cooling air from the outlet 40p passes through the cooling air reservoir 41 via the opening 41a. Then, the cooling air passes through the openings 43R, 43G and 43B of the distribution sheet 43 and the openings 42R, 42G and 42B of the optical unit frame 50a so as to be sent to the elements for display, 600R, 600G and 600B.

The cooling air reservoir 41, the distribution sheet 43, and the openings 42R, 42G and 42B of the optical unit frame 50a correspond to one embodiment of distribution means in the present invention.

As shown in FIG. 8, in the preferred embodiment of the present invention, a direction of the cooling air CW exhausted from the outlet 40p is identical with a direction of air sent to the elements for display, 600R, 600G and 600B. Therefore, the cooling air CW directly hits the elements for display, 600R, 600G and 600B. Exhausted air HW, which hits the elements for display, 600R, 600G and 600B to deprive heat of the elements for display, is exhausted from an opening 42op provided at the position facing the openings 42R, 42G and 42B of the optical unit frame 50a.

As described above, in the preferred embodiment of the present invention, a pressure loss of the cooling air CW can be minimized. At the same time, the quantity of air to be blown can be restrained from being reduced. Therefore, the elements for display, 600R, 600G and 600B, can be efficiently cooled.

Moreover, since the quantity of air to be blown can be restrained from being reduced, the quantity of the cooling air CW ensuring predetermined cooling performance can be blown even if a driving voltage of the sirocco fan 40 is lowered. Thus, fan noise generated by the sirocco fan 40 can be remarkably reduced so that the liquid crystal projector 3 can operated in a more silent manner.

Furthermore, in the preferred embodiment of the present invention, the sirocco fan 40 is connected to the optical unit 50 through the cooling air reservoir 41 and the distribution sheet 43. As shown in FIG. 8, the cooling air reservoir 41 is abutted against the thin-sheet like distribution sheet 43 to form a tank shape where the cooling air CW from the outlet 40p is temporarily stored. The cooling air CW in the cooling air reservoir 41 is exhausted from each of the openings 43R, 43G and 43B of the distribution sheet 43 in quantity in accordance with its area.

Cooling air CWB exhausted from the opening 43B passes through the opening 42B to hit the element 600B for display, whereas cooling air CWR exhausted from the opening 43R passes through the opening 42R to hit the element 600R for display. Cooling air CWG exhausted from the opening 43G not shown in FIG. 8 passes through the opening 42G to hit the element 600G for display.

As a result, the cooling air CW from the outlet 40p can be divided into desired air quantities so as to be sent to the elements for display, 600R, 600G and 600B, respectively.

Figure 9:
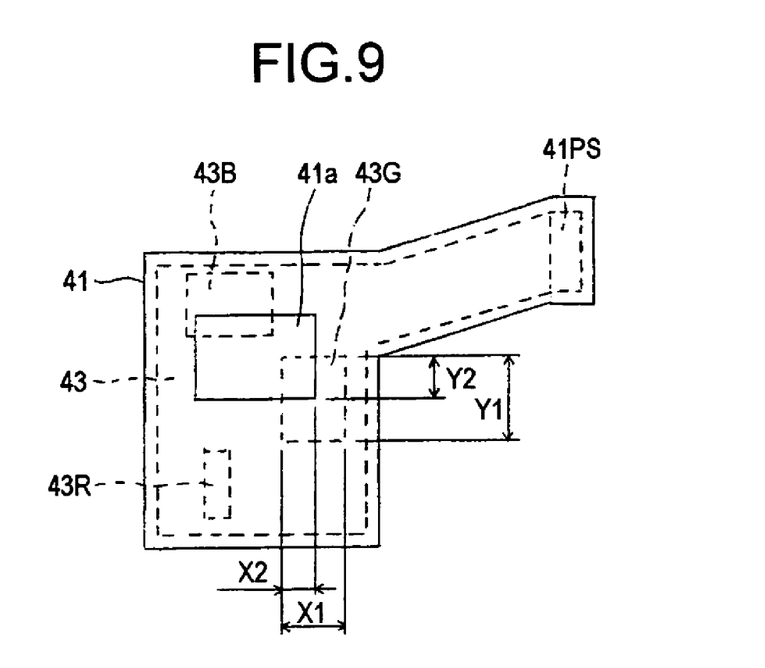
FIG. 9 is a plan view of a distribution sheet and a cooling air reservoir shown in FIG. 6, seen from the sirocco fan side.

FIG. 9 is a plan view showing the cooling air reservoir 41 abutted against the distribution sheet 43, which is seen from the sirocco fan 40 side.

As shown in FIGS. 6 and 9, a part of the cooling air reservoir 41 is extended. On the tip of the extended portion, an opening 41PS is formed while the cooling chamber 41 is abutted against the distribution sheet 43.

The opening 41PS is formed so that a part of the cooling air CW is guided to the position where the PS converting element 54 is provided when the cooling air reservoir 41 is attached to the optical unit frame 50a. On a sidewall of the optical unit frame 50a, an opening 42PS is provided at the position where the PS converting element 54 is provided, as shown in FIG. 6. Cooling air CWPS from the opening 41PS passes through the opening 42PS to hit the PS converting element 54.

Among the red light LR, the green light LG and the blue light LB, the blue light LB having the shortest wavelength has the highest energy. Correspondingly, among the three elements for display, 600R, 600G and 600B and the PS converting element 54, the element 600B for display, on which the blue light LB is condensed to be incident, is likely to have the highest temperature. In the second and third places, the element 600G for display and the element 600R for display have higher temperatures in this order.

In the preferred embodiment of the present invention, the areas of the openings 43R, 43G, 43B and 41PS and the area and the position of the opening 41a of the cooling air reservoir 41 with respect to the openings are appropriately set so that an appropriate quantity of cooling air easily hits each of the optical components.

Furthermore, in the preferred embodiment of the present invention, chokes 43BW and 43GW are provided for the openings 43B and 43G of the distribution sheet 43, respectively, as shown in FIG. 6.

The chokes 43BW and 43GW correspond to one preferred embodiment of choke means in the present invention. For example, the openings 43B and 43G and the chokes 43BW and 43GW can be simultaneously formed by making cuts in the distribution sheet 43 made of a metal or a resin and then bending the cut portions toward the optical unit 50. However, the chokes 43BW and 43GW may alternatively be provided for the openings 42B and the 42G of the optical unit frame 50a.

The chokes 43BW and 43GW reduce a width of the cooling air CW from the outlet 40p. As a result, for example, even in the case where an aspect ratio of a rectangular display area of each of the liquid crystal panels 63B, 63G and 63R is 9:16, a width for air to be blown can be easily matched with a length of a shorter edge. Moreover, with reduction in width for air to be blown, a wind velocity of the cooling air is increased, resulting in increase in the quantity of air blown per unit time. Therefore, the elements for display, 600B, 600G and 600R, including the liquid crystal panels 63B, 63G and 63R, can be more efficiently cooled.

As an example, it is assumed that a length X1 of a shorter edge and a length Y1 of a longer edge of the rectangular openings 43B and 43G are respectively 15 mm and 16 mm and a length of a shorter edge and a length of a longer edge of the rectangular opening 43R are respectively 4 mm and 16 mm. It is also assumed that a length of a shorter edge of the rectangular opening 41a and those of the opening 41PS of the cooling air reservoir 41 are respectively, 17 mm and 21 mm, and 3 mm and 14 mm.

The opening 41a having the above-mentioned size partially overlaps the opening 43G. In the case where the amount of overlap of the opening 41a with respect to the length Y1 of the longer edge of the opening 43G is Y2 and the amount of overlap with respect to the length X1 of the shorted edge is X2, it is assumed that: Y2=Y1/2 and X2=X1/2 as an example in the preferred embodiment of the present invention.

As the sirocco fan 40, for example, a sirocco fan having the maximum air quantity of 0.19 m$^3$/min and the maximum static pressure of 129.4 Pa (13.2 mmH$_2$O) at a driving voltage 8 V is used.

Under the above conditions, the chokes 43BW and 43GW are respectively provided for the openings 43B and 43G, and the sirocco fan 40 is driven at 8V. At this time, the quantity of the exhausted air HW measured at the opening 42op of the optical unit frame 50a is about 0.145 m$^3$/min at maximum.

In the case where the cooling air CW is blown via the duct 30 as shown in FIG. 13 under the same conditions except that the cooling air is not directly sent to the elements for display, 600R, 600G and 600B, the quantity of the exhausted air is 0.12 m$^3$/min. Therefore, air blowing efficiency is improved by 20% or more.

Percentages of the quantities of the cooling airs CWB, CWG, CWR and CWPS are 41%, 39%, 17% and 3% in this order.

As described above, according to the preferred embodiment of the present invention, since the cooling air CW can be directly sent to the elements for display, 600R, 600G and 600B without using any ducts, a cooling efficiency can be remarkably improved as compared with a conventional one. Therefore, a driving voltage of the sirocco fan 40 can be reduced so as to also restrain the noise generation of the liquid crystal projector 3.

Furthermore, since the cooling air CW can be appropriately distributed in accordance with a rate of temperature elevation of the elements for display, 600R, 600G and 600R, and the PS converting element 54, predetermined performance of these optical components, in turn, that of the liquid crystal projector 3, can be stably ensured.

Although the distribution sheet 43 and the cooling air reservoir 41 have been described as independent parts, these components may be integrally formed with the optical unit frame 50a or may be integrally formed with the outlet 40a of the sirocco fan 40.

In the case where the distribution sheet 43 and the cooling air reservoir 41 are integrally formed with the optical unit frame 50a, these components can be handled in a simplified way on assembly, maintenance and component replacement of the liquid crystal projector 3 because these components are formed as a unit.

In FIG. 5, the power source section 81 and the power source section 82 for light source are respectively constituted by a printed wiring board, an electronic component or the like. The power source section 81 and the power source section 82 for light source constitute a power source section of the present invention.

The power source section 81 supplies electric power for driving the liquid crystal panels 63R, 63G and 63B, the sirocco fan 40, the axial fans 70 and 71 and the like.

The power source section 82 for light source supplies electric power for driving a light source of the light source unit 66. At the top of the power source section 81 and the power source section 82 for light source, a plate member 83 is provided. The plate member 83 is provided for forming an airflow path.

Since the power source section 81 and the power source section 82 for light source emit heat when electric power is supplied thereto, it is necessary to externally exhaust the heat generated from the power source section 81 and the power source section 82 for light source.

The axial fan 70 is placed beside the power source section 81 and the power source section 82 for light source. The axial fan 70 mainly takes air in on the side of the power source section 81 and the power source section 82 for light source to deliver the intake air toward the air guide 33. As shown in FIG. 5, outlets 4Bh2 are formed at the position of the lower box 4B where the air guide 33 is provided. A direction of the air delivered by the axial fan 70 is turned by the air guide 33 so that the air is downwardly exhausted from the outlets 4Bh2.

The axial fans 71 are provided in front of the light source unit 66, as shown in FIG. 5.

Two axial fans 71 are provided in series. By this arrangement, a large quantity of exhausted air and a high static pressure, which cannot be achieved by a normal axial fan having the same size, can be obtained. On the other hand, a driving voltage of the fun, which is needed to obtain a required quantity of exhausted air and a required static pressure, can be lowered to restrain noise generated by the axial fans 71.

An exhaust duct 32 is provided on the exhaust side of the axial fans 71. The exhaust duct 32 guides an airflow delivered from the axial fans 71 to the outlets 4Bh1 formed in the lower box 4B.

Figure 10:
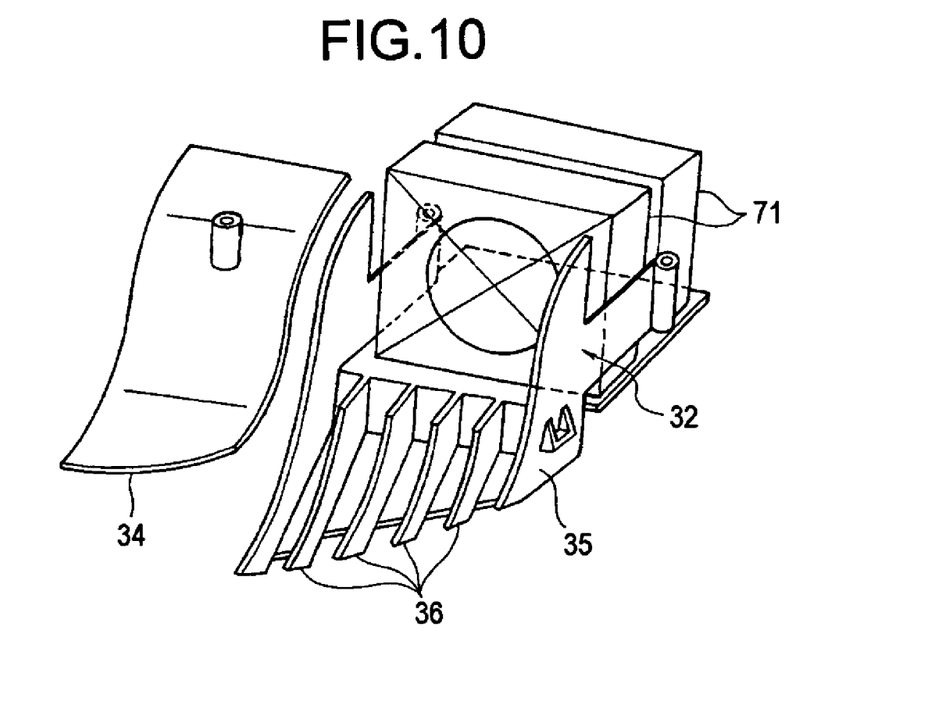
FIG. 10 is a perspective view showing a structure of an exhaust duct.

FIG. 10 is a perspective view illustrating a structure of the exhaust duct 32.

In FIG. 10, the exhaust duct 32 includes a duct body 35 and a cover member 34, which form an exhaust path. In practice, the cover member 34 is fixed onto the duct body 35.

A plurality of guide plates 36 are formed in the exhaust path formed by the duct body 35 and the cover member 34.

The plurality of guide plates 36 act so that an airflow delivered by the axial fans 71 uniformly flows through the exhaust path to obtain a uniform distribution of the quantity of exhausted air at the outlets 4Bh1. The airflow delivered by the axial fans 71 has an elevated temperature. The airflow, which is locally concentrated on the outlets 4Bh1, is not preferred because a region having an elevated temperature is locally generated in the outlets 4Bh1. The plurality of guide plates 36 are provided so as to uniformly diffuse the airflow having an elevated temperature at the outlets 4Bh1. As a result, the generation of a region having an elevated temperature can be prevented.

Next, an exhaust operation by the axial fans 70 and 71 in the liquid crystal projector 3 having the above-described structure will be described with reference to FIGS. 11 and 12.

Figure 11:
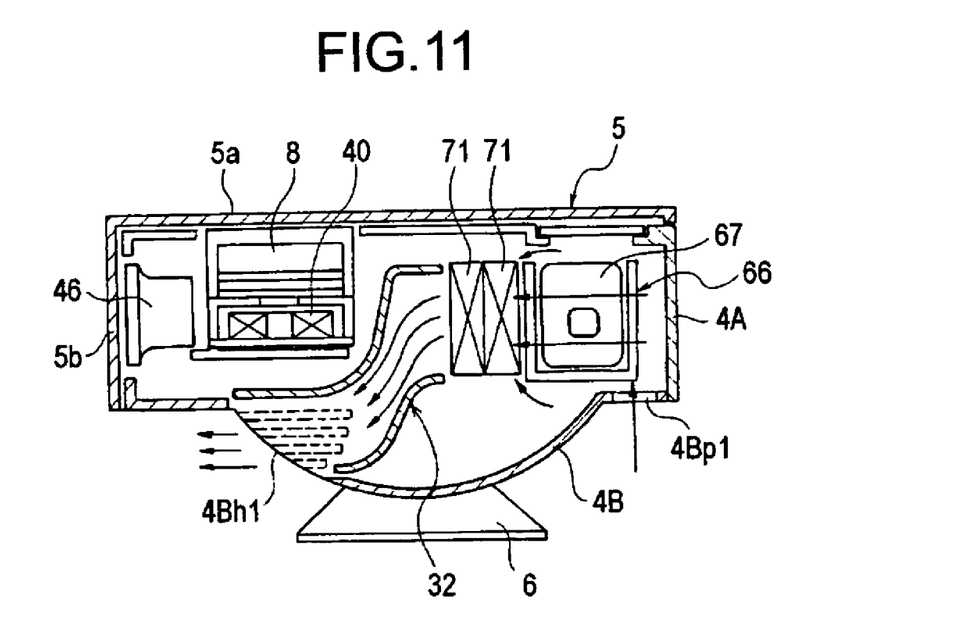
FIG. 11 is a view showing an exhaust operation by an axial fan for exhausting heat generated from a light source.

FIG. 11 illustrates an exhaust operation by an axial fan for exhausting heat generated by the light source.

As shown in FIG. 11, an inlet port 4Bp1 is formed on a rear end of the lower box 4B where the light source unit 66 is placed. The inlet port 4Bp1, the axial fans 71, the exhaust duct 32 and the outlets 4Bh1 constitute exhaust means for light source, which generates an airflow for externally exhausting the heat generated by the light source of the present invention.

When the axial fans 71 are driven, air is taken in from the inlet port 4Bp1 to pass through the light source unit 66 via the exhaust duct 32 so as to be externally exhausted from the outlets 4Bh1. As a result, the heat generated by the light source unit 66 is externally exhausted.

At this time, the outlets 4Bh1 are formed on the front lateral face 4Bf of the projecting portion of the lower box 4B and discharges high-temperature air from the box 4 in a horizontal direction along a region sandwiched between the support 6 and the upper box 4A. Therefore, the exhausted high-temperature air is not directly sent to hit the support 6, the box 4, or a table on which the support 6 is placed. Accordingly, the components are prevented from being heated by air under high temperature.

Figure 12:
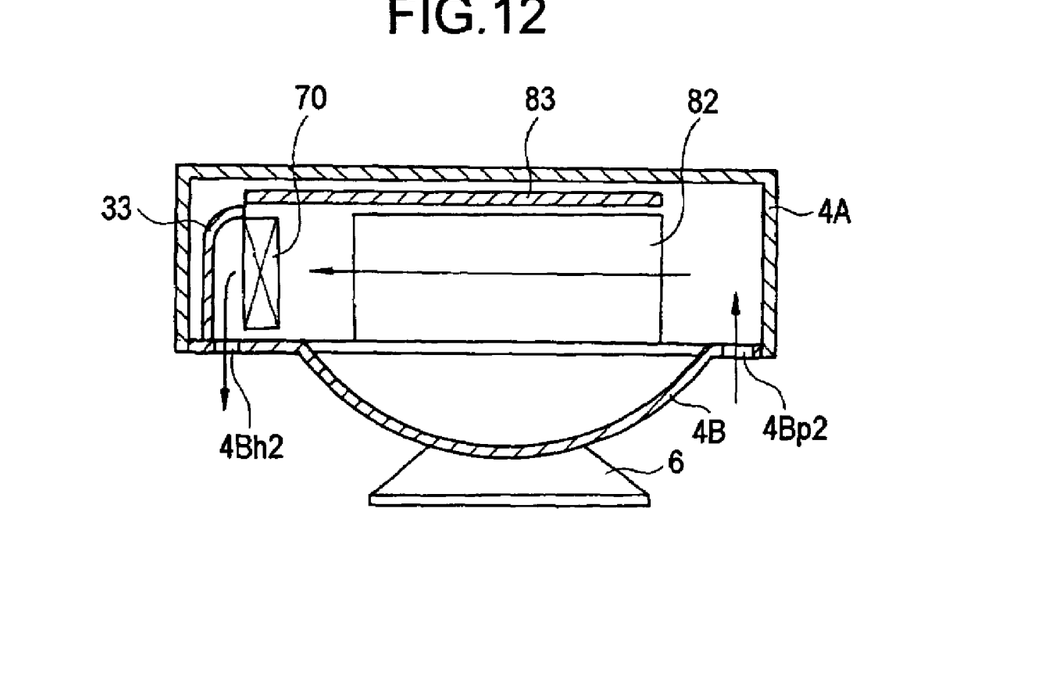
FIG. 12 is a view showing an exhaust operation by an axial fan for exhausting heat generated from a power source.

FIG. 12 illustrates an exhaust operation by the axial fan 70 for exhausting heat generated by the power source.

As shown in FIG. 12, an inlet port 4Bp2 is formed on a rear end of the lower box 4B where the power source section 82 is placed. The inlet port 4Bp2, the plate member 83, the axial fan 70, the air guide 33 and the outlet 4Bh2 constitute exhaust means for power source, which generates an airflow for externally exhausting the heat generated by the power source section of the present invention.

When the axial fan 70 is driven, air is taken in from the inlet port 4Bp2 to pass through the power source section 82 so as to be externally exhausted from the outlets 4Bh1. As a result, the heat generated by the power source section 82 is externally exhausted.

Herein, it is assumed that an airflow generated by the axial fans 71 is AF1, an airflow generated by the axial fan 70 is AF2, and an airflow generated by the sirocco fan 40 is AF3. As shown in FIG. 5, a path of the airflow AF1 generated by the axial fans 71 and that of the air flow AF2 generated by the axial fan 70 are separated from each other. Therefore, the heat generated by the power source sections 81 and 82 and the heat generated by the light source unit 66 can be externally exhausted in an efficient manner, thus the heat is unlikely to stagnate within the box 4.

Furthermore, as shown in FIG. 5, after the airflow AF3 generated by the sirocco fan 40 cools the optical unit, the airflow AF3 joins the airflow AF2 generated by the axial fan 70 so as to be externally exhausted from the outlet 4Bh2. Therefore, since the airflow AF3 generated by the sirocco fan 40 cools the optical unit, air having an elevated temperature is unlikely to reside in the box 4.

In the preferred embodiment of the present invention, the exhausted heat of the power source 81 and 82 and the exhausted heat of the light source unit 66 are separated from each other so that a volume of each of the axial fans 70 and 71 is reduced. As a result, noise generated from the axial fans 70 and 71 can be reduced.

Furthermore, in the preferred embodiment of the present invention, air is taken into the box 4 uniquely through the inlet ports 4Bp1, 4Bp2 and 4Ah to be divided for the axial fans 70 and 71 so as to increase the quantity of exhausted air. Thus, a pressure in the box 4 becomes lower than the atmospheric pressure. As a result, a sufficient quantity of air is always supplied to the box 4 so as to ensure that a temperature in the device is restrained from being elevated.

Moreover, the heat generated from the light source placed in the box 4 is exhausted by the plurality of axial fans 71 arranged in series. As a result, the heat can be efficiently exhausted with noise being reduced.

As described above, in the preferred embodiment of the present invention, the optical components having an elevated temperature can be appropriately and efficiently cooled in accordance with their temperatures. At cooling, since a driving voltage of the sirocco fan 40 can be lowered, the liquid crystal projector 3 can be operated in a more silent manner. As a result, the power consumption of the liquid crystal projector 3 can be decreased.

Furthermore, according to a preferred embodiment of the present invention, the upper surface and the front face of the box 4 can be entirely covered with the cover member 5, so that noise generated from the axial fans 70 and 71 or the sirocco fan 40 can be prevented from being diffused. As a result, the liquid crystal projector 3 can be operated in a more silent manner.

Moreover, according to the preferred embodiment of the present invention, a novel design can be realized by omitting an opening for heat exhaust on the upper box 4A. As a result, an original differencing design can be obtained.

The present invention is not limited to the above-described embodiment; the present invention can be appropriately changed. For example, in the above-described embodiment, a triple-plate transmission type liquid crystal projector has been exemplified. However, the liquid crystal panel of the present invention is not limited to a transmission type liquid crystal panel. Other liquid crystal panels such as a reflection type liquid crystal panel may be used. Moreover, a single-plate type liquid crystal panel may be employed. Furthermore, modulation means is not limited to the liquid crystal panel. Other modulation means such as a DMD (Digital Micromirror device) can also be used.

The specific shape and structure of each portion described in the above embodiment are merely examples for illustrating the implementation of the present invention. Therefore, a technical scope of the present invention should not be read as limitative.

It is therefore to be understood by those of ordinary skill in the art that any changes, variations, combinations and sub-combinations of the examples of preferred embodiments of the present invention may be practiced otherwise than as specifically described herein in the present specification without departing from the scope and spirit of the present invention.

What is claimed is:

1. A projection type display device, comprising:
    a light source;
    an optical system for modulating illumination light output from said light source based on input image information;
    a power source section for supplying electric power for driving said light source;
    a box for housing said optical system, said light source and said power source section;
    exhaust means for exhausting air within said box by using at least one axial fan; and
    a cover member for covering an upper surface of said box, wherein
    an outlet of said exhaust means is provided in a bottom side of said box, and wherein
    said cover member commonly covers a plurality of apertures formed on an upper side of said box for removing and/or installing components.

2. A projection type display device comprising:
    a light source;
    an optical system for modulating illumination light output from said light source based on input image information;
    a power source section for supplying electric power for driving said light source;
    a box for housing said optical system, said light source and said power source section;
    exhaust means for exhausting air within said box by using at least one axial fan; and
    a cover member for covering an upper surface of said box, wherein
    an outlet of said exhaust means is provided in a bottom side of said box, and wherein
    said exhaust means:
    generates a first airflow for exhausting heat generated from said light source; and
    generates a second airflow for exhausting heat generated from said power source section, wherein
    respective paths for the first and second airflows generated by said exhaust means are separated from each other.

3. The projection type display device according to claim 2, further comprising:
    a downwardly projecting support member for supporting said box, wherein
    said box includes a projecting portion supported by said support member, and wherein
    an outlet of said exhaust means for said light source is formed in said projecting portion so as to laterally exhaust air between said support member and said box.

4. The projection type display device according to claim 2, wherein said exhaust means further comprises:
    an inlet formed in proximity to said light source in a bottom of said box;
    an outlet disposed in the bottom of said box;
    a plurality of axial fans disposed in line for air conduction; and
    an exhaust duct for leading air flow from said inlet, passing though said light source and conducted by said plurality of axial fans, to said outlet.

5. The projection type display device according to claim 4, wherein said exhaust duct comprises a plurality of guide plates for equalizing a distribution of a volume of air exhausted through said outlet.

6. The A projection type display device comprising:
a light source;
an optical system for modulating illumination light output from said light source based on input image information;
a power source section for supplying electric power for driving said light source;
a box for housing said optical system, said light source and said power source section;
exhaust means for exhausting air within said box by using at least one axial fan;
a cover member for covering an upper surface of said box; and
a sirocco fan for taking air in from outside of said box and discharging the air toward an optical component of said optical system that has a temperature thereof increased by absorbing illumination light of said optical system, wherein
an inlet for said sirocco fan is formed on a side of said box, and wherein
an outlet of said exhaust means is provided in a bottom side of said box.

7. The projection type display device according to claim 6, wherein said sirocco fan is disposed at a position where cooling air discharged from said sirocco fan merges into an airflow originated by said exhaust means after cooling said optical component.

8. A projection type display device in which illumination light is modulated and projected based on input image data, said projection type display device comprising:
a single sirocco fan directly connected to a frame holding a red optical component, green optical component, and a blue optical component that each have a temperature thereof increased by absorbing said illumination light for discharging cooling air taken from outside towards said red, green, and blue optical components; and
distribution means including a distribution sheet having differently sized apertures formed therein for distributing said cooling air to said red, green, and blue optical components, such that a quantity of cooling air delivered to said red optical component differs from a quantity of cooling air delivered to said green optical component that differs from a quantity of cooling air delivered to said blue optical component.

9. A projection type display device according to claim 8, further comprising a body element containing said frame and said distribution means.

* * * * *